United States Patent
Li et al.

(10) Patent No.: US 10,224,727 B2
(45) Date of Patent: Mar. 5, 2019

(54) MULTI-FUNCTIONAL HUB INTEGRATED WITH AC POWER SUPPLY

(71) Applicants: Dong-Sheng Li, Taipei (TW);
Kuang-Feng Lin, Taipei (TW);
Ching-Pao Hsiao, Taipei (TW);
Gen-Jie Hsiao, Taipei (TW);
Chen-Sheng Lee, Taipei (TW)

(72) Inventors: Dong-Sheng Li, Taipei (TW);
Kuang-Feng Lin, Taipei (TW)

( * ) Notice: Subject to any disclaimer, the term of this patent is extended or adjusted under 35 U.S.C. 154(b) by 360 days.

(21) Appl. No.: 15/176,260

(22) Filed: Jun. 8, 2016

(65) Prior Publication Data

US 2017/0005494 A1 Jan. 5, 2017

Related U.S. Application Data

(63) Continuation-in-part of application No. 14/992,130, filed on Jan. 11, 2016, now Pat. No. 9,864,421.
(Continued)

(51) Int. Cl.
*H02J 7/00* (2006.01)
*G06F 13/42* (2006.01)
(Continued)

(52) U.S. Cl.
CPC ............ *H02J 7/0044* (2013.01); *G06F 1/263* (2013.01); *G06F 1/266* (2013.01);
(Continued)

(58) Field of Classification Search
None
See application file for complete search history.

(56) References Cited

U.S. PATENT DOCUMENTS 6,614,206 B1 * 9/2003 Wong .................... G06F 1/1632
320/135
7,460,889 B2 12/2008 Darshan et al.
(Continued)

FOREIGN PATENT DOCUMENTS

CN 102236374 A * 11/2011 ............. G06F 1/263
CN 202550224 U * 11/2012
(Continued)

OTHER PUBLICATIONS

'USB Power Delivery Specification 1.0 Introduction,' Jul. 16, 2012.*
(Continued)

*Primary Examiner* — Steven G Snyder

(57) ABSTRACT

A hub is electrically connected with an electronic device, an AC source, and at least one portable device which are located in the outside environment. The electronic device includes a USB port. The hub includes a first connector, a second connector, a third connector, a controller, and a power module. The first connector is electrically connected with the USB port of the electronic device. The first connector includes a first data transmission line and a first power line. The third connector is electrically connected with the AC source. The controller is electrically connected between the first data transmission line and a second data transmission line. The controller and the portable device transmit data to each other. The controller sends a signal to the portable device, enabling the portable device to start a quick charge mode. The power module is electrically connected with the first connector, the second connector, and the third connector. The power module supplies power outputted from the AC source or the electronic device to the portable device.

18 Claims, 17 Drawing Sheets

Related U.S. Application Data

(60) Provisional application No. 62/312,056, filed on Mar. 23, 2016, provisional application No. 62/186,713, filed on Jun. 30, 2015.

(51) Int. Cl.
    *G06F 1/26*         (2006.01)
    *H02M 1/10*       (2006.01)

(52) U.S. Cl.
    CPC ........ *G06F 13/4282* (2013.01); *H02J 7/0013* (2013.01); *H02J 7/0052* (2013.01); *H02J 7/0054* (2013.01); *H02J 7/0055* (2013.01); *G06F 2213/0042* (2013.01); *H02J 2007/0059* (2013.01); *H02J 2007/0062* (2013.01); *H02M 1/10* (2013.01)

(56) References Cited

U.S. PATENT DOCUMENTS

| | | | |
|---|---|---|---|
| 7,631,111 B2 | 12/2009 | Monks et al. | |
| 8,055,919 B2 | 11/2011 | Magnusson | |
| 8,107,243 B2 | 1/2012 | Guccione et al. | |
| 8,237,414 B1* | 8/2012 | Li | H02J 7/0003 320/103 |
| 8,312,199 B2 | 11/2012 | Johnson | |
| 8,794,997 B2 | 8/2014 | Tin | |
| 8,799,537 B1* | 8/2014 | Zhu | G06F 13/385 710/14 |
| 9,048,666 B2* | 6/2015 | Su | H02J 7/0013 |
| 9,092,207 B2* | 7/2015 | Zai | G06F 1/263 |
| 9,606,597 B2 | 3/2017 | Chen | |
| 9,766,674 B2* | 9/2017 | Dunstan | G06F 13/385 |
| 9,864,421 B2* | 1/2018 | Li | G06F 1/26 |
| 9,997,939 B2* | 6/2018 | Li | G06F 13/4022 |
| 10,001,799 B2* | 6/2018 | Leinonen | G05F 3/02 |
| 10,127,181 B2* | 11/2018 | Ghosh | H02J 7/0052 |
| 2005/0033996 A1 | 2/2005 | Fong et al. | |
| 2005/0080974 A1* | 4/2005 | Lin | G06F 13/385 710/315 |
| 2009/0082910 A1 | 3/2009 | Sato | |
| 2010/0060081 A1 | 3/2010 | Cheong et al. | |
| 2010/0067197 A1 | 3/2010 | Guccione et al. | |
| 2010/0205463 A1 | 8/2010 | Magnusson | |
| 2011/0156483 A1* | 6/2011 | Caraghiorghiopol | G06F 1/263 307/66 |
| 2012/0011376 A1* | 1/2012 | Zai | G06F 1/263 713/300 |
| 2012/0203937 A1* | 8/2012 | Mohanty | G06F 13/385 710/16 |
| 2012/0265911 A1* | 10/2012 | Connolly | G06F 13/387 710/300 |
| 2012/0297207 A1* | 11/2012 | Carlsen | G06F 13/4081 713/300 |
| 2013/0190059 A1 | 7/2013 | Song et al. | |
| 2013/0234668 A1 | 9/2013 | Kuo et al. | |
| 2013/0267116 A1* | 10/2013 | Tin | H02J 1/00 439/535 |
| 2013/0339769 A1* | 12/2013 | Waters | G06F 1/266 713/310 |
| 2014/0208134 A1* | 7/2014 | Waters | G06F 13/385 713/310 |
| 2014/0368159 A1* | 12/2014 | Han | H02M 3/155 320/107 |
| 2015/0015184 A1* | 1/2015 | Su | H02J 7/0013 320/107 |
| 2015/0042889 A1* | 2/2015 | Wang | G06F 13/385 348/706 |
| 2015/0089092 A1* | 3/2015 | Voto | G06F 13/4282 710/14 |
| 2015/0237567 A1 | 8/2015 | Xue et al. | |
| 2015/0256017 A1* | 9/2015 | Hays | H02J 7/0054 320/103 |
| 2015/0268688 A1* | 9/2015 | Leinonen | G06F 13/409 307/147 |
| 2015/0318728 A1* | 11/2015 | Ghosh | G06F 13/4282 320/107 |
| 2015/0378409 A1* | 12/2015 | Dunstan | G06F 13/385 713/310 |
| 2016/0139640 A1* | 5/2016 | Hijazi | G06F 1/26 361/679.31 |
| 2016/0163480 A1* | 6/2016 | Lester | G06F 13/00 713/300 |
| 2016/0202743 A1* | 7/2016 | Li | G06F 1/26 710/313 |
| 2016/0277235 A1* | 9/2016 | Bhesania | H04L 41/0803 |
| 2016/0371213 A1* | 12/2016 | Voto | G06F 13/4022 |
| 2017/0192466 A1* | 7/2017 | Paul | A63F 13/98 |
| 2017/0293335 A1* | 10/2017 | Dunstan | G06F 1/266 |
| 2018/0026469 A1* | 1/2018 | Kamath | H02J 7/025 |
| 2018/0097385 A1* | 4/2018 | Li | G06F 13/4022 |

FOREIGN PATENT DOCUMENTS

| | | | |
|---|---|---|---|
| CN | 202550224 U | 11/2012 | |
| CN | 203324980 U * | 12/2013 | |
| CN | 103744815 A | 4/2014 | |
| CN | 106654742 A * | 5/2017 | |
| CN | 206195402 U * | 5/2017 | |
| JP | 2000010671 A | 1/2000 | |
| JP | 2017016659 A * | 1/2017 | ............ H02J 7/0044 |
| TW | 201331744 A | 8/2013 | |

OTHER PUBLICATIONS

'Qualcomm's Quick Charge 2.0 technology explained' by Robert Triggs, Nov. 6, 2014.*
'Quick, Rapid, Turbo, and Fast Charging Explained: What You Need to Know About Charging Your Smartphone' by David Ruddock, Jun. 12, 2015.*
'Qualcomm Quick Charge 1.0: Less Time Charging, More Time Doing' by PJ Jacobowitz, Feb. 14, 2013.*
'ISP1261—USB OTG bridge controller' by Philips, Aug. 2004.*

* cited by examiner

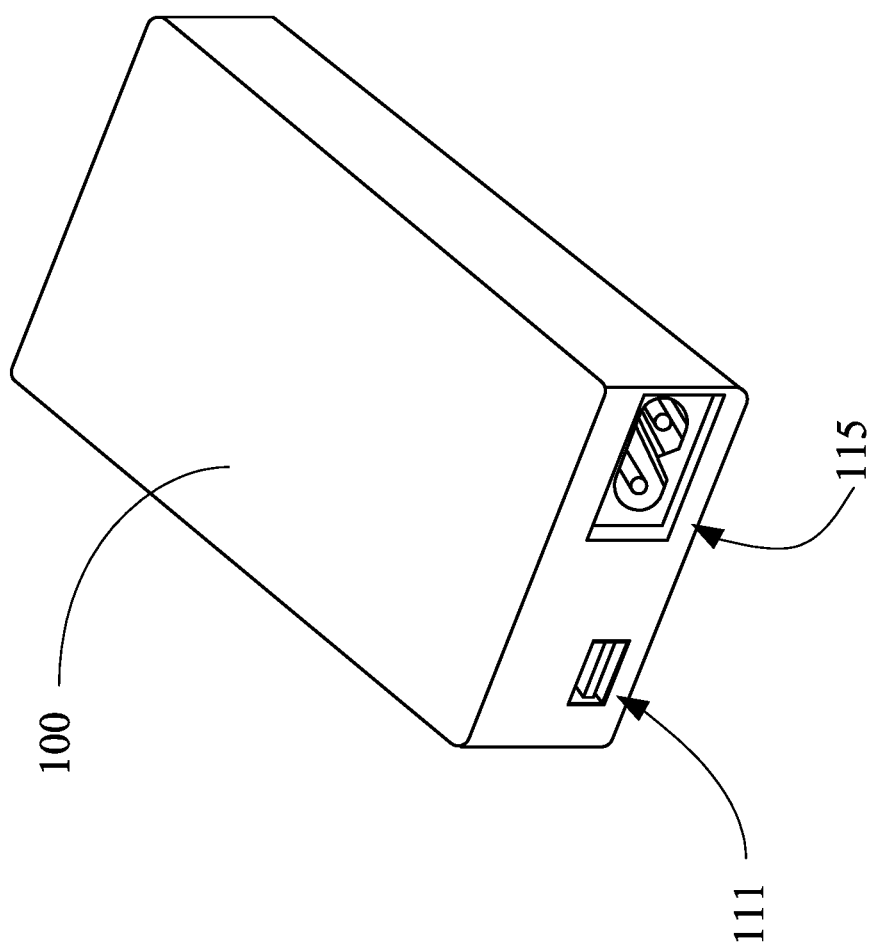

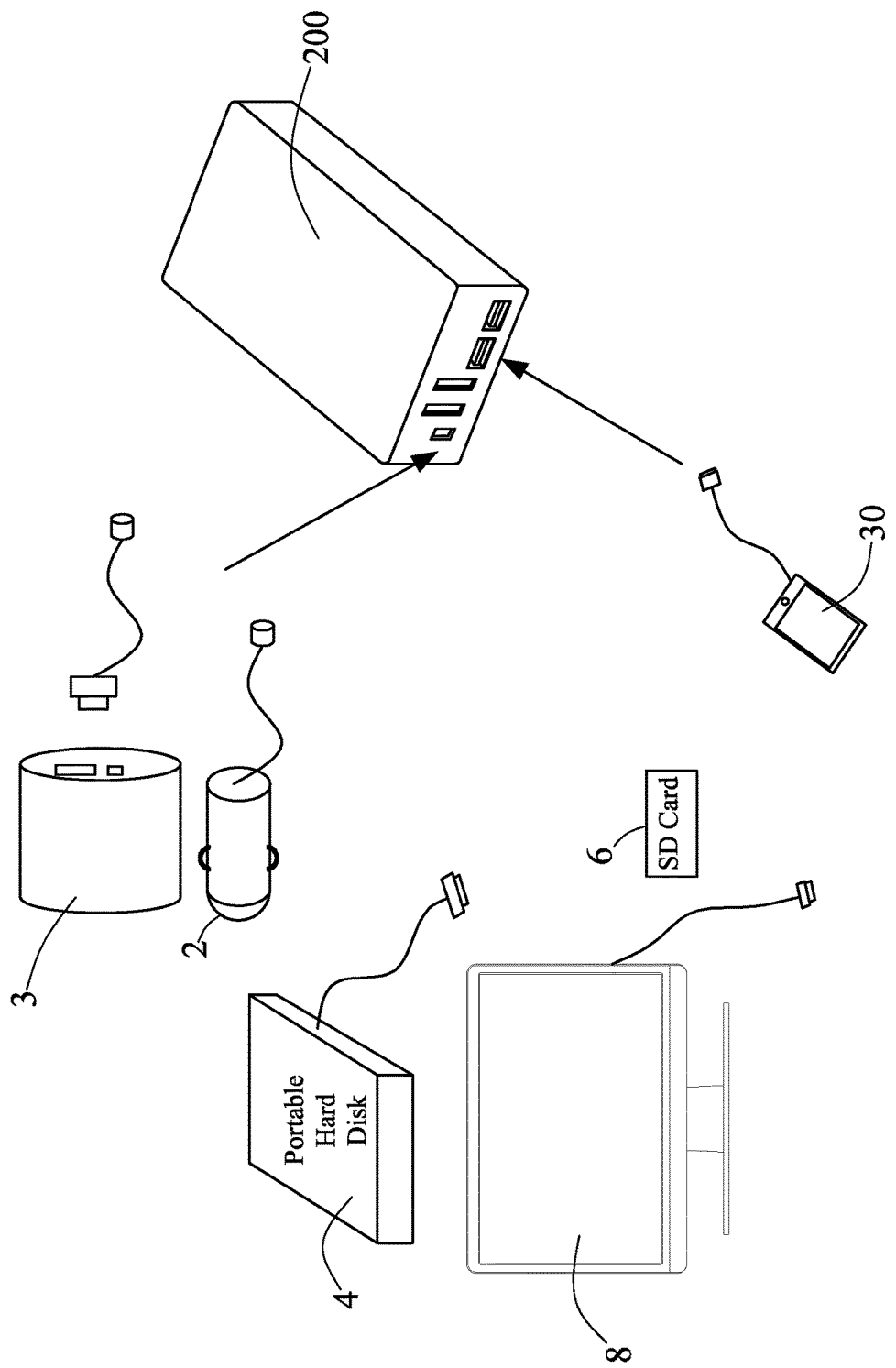

MULTI-FUNCTIONAL HUB INTEGRATED WITH AC POWER SUPPLY

BACKGROUND OF THE INVENTION

1. Field of the Invention

The present invention relates to a hub, and more particularly to a hub having a compound power source and capable of transmitting data and charging.

2. Description of the Prior Art

These days, with the development of technology, the size of various portable devices (such as cell phones) becomes smaller and smaller, so that the portable devices can be carried conveniently. In general, the portable devices rely on a battery to maintain a normal operation. When the battery runs out, the portable device needs to be charged immediately.

Nowadays, the portable devices can be charged with an adapter (or a charger) in cooperation with the mains (AC power supply). Consumers may use the USB of a personal computer for charging. However, The USB of a personal computer or a notebook computer usually provides only a standard charging mode of 500 mA. There are various portable devices on the market. A person may own at least two portable devices, such as a cell phone, an external hard disk, a tablet computer, a digital camera, and the like. Sometimes, the number of the USB ports of a desktop computer is not enough for use. The user may purchase a USB hub so as to increase the number of USB ports. In particular, for a compact notebook computer to be carried conveniently, the number of the USB ports will be reduced accordingly. The compact notebook computer may provide only two USB ports, and it may provide only one USB port in the future. When the user goes out, he/she has to carry not only the required cell phone, notebook computer, and hub but also the corresponding adapters. This is very inconvenient for use. At present, there are some electronic products for a quick charge (such as, a car charger or a charger having a plurality of USB ports). Although these products have enough power for a plurality of portable electronic devices to be charged quickly, they are unable to transmit data. A traditional USB hub is able to increase the number of USB ports for data transmission among a plurality of portable devices, but the USB ports of a normal apparatus provide a limited power source. In order to avoid the overcurrent of the USB port or because of the lack of a quick charge and a signal transmission function (such as, CDP mode), the portable devices are allowed to be charged in a standard mode. The hub is unable to provide a quick charge function. Few hubs on the market are provided with an additional adapter to provide more power sources. However, the user has to take at least two adapters along. This increases cost and inconvenience. Some of the USB hubs are switched manually for switching a USB power source and an external power source, which is quite inconvenient for use.

Therefore, how to solve the above problems and develop a hub which is capable of transmitting data and charging in a quick manner and can be carried conveniently and is cost-effective is worth to be considered for a person skilled in this field. Accordingly, the inventor of the present invention has devoted himself based on his many years of practical experiences to solve these problems.

SUMMARY OF THE INVENTION

The primary object of the present invention is to provide a hub capable of transmitting data and charging. The hub can be carried conveniently and charged anytime and anywhere.

In order to achieve the aforesaid object and other objects, the hub of the present invention is electrically connected with an electronic device, an AC source, and at least one portable device which are located in the outside environment. The electronic device includes a USB port. The hub includes a first connector, at least one second connector, a third connector, a controller, and a power module. The first connector is electrically connected with the USB port of the electronic device. The first connector includes a first data transmission line and a first power line. The second connector is electrically connected with the portable device. The second connector includes a second data transmission line and a second power line. The third connector is electrically connected with the AC source. The controller is electrically connected between the first data transmission line and the second data transmission line. The controller and the portable device transmit data to each other. The controller sends a signal to the portable device, enabling the portable device to start a quick charge mode. The power module is electrically connected with the first connector, the second connector, and the third connector. The power module supplies power outputted from the AC source or the electronic device to the portable device.

BRIEF DESCRIPTION OF THE DRAWINGS

FIG. 1A and FIG. 1B are perspective views of the hub in accordance with a first embodiment of the present invention;

FIG. 9A and FIG. 9B are schematic views of the hub of the present invention when in use.

DETAILED DESCRIPTION OF THE PREFERRED EMBODIMENTS

Embodiments of the present invention will now be described, by way of example only, with reference to the accompanying drawings, in which like reference numbers refer to like elements throughout.

Figure 1A:
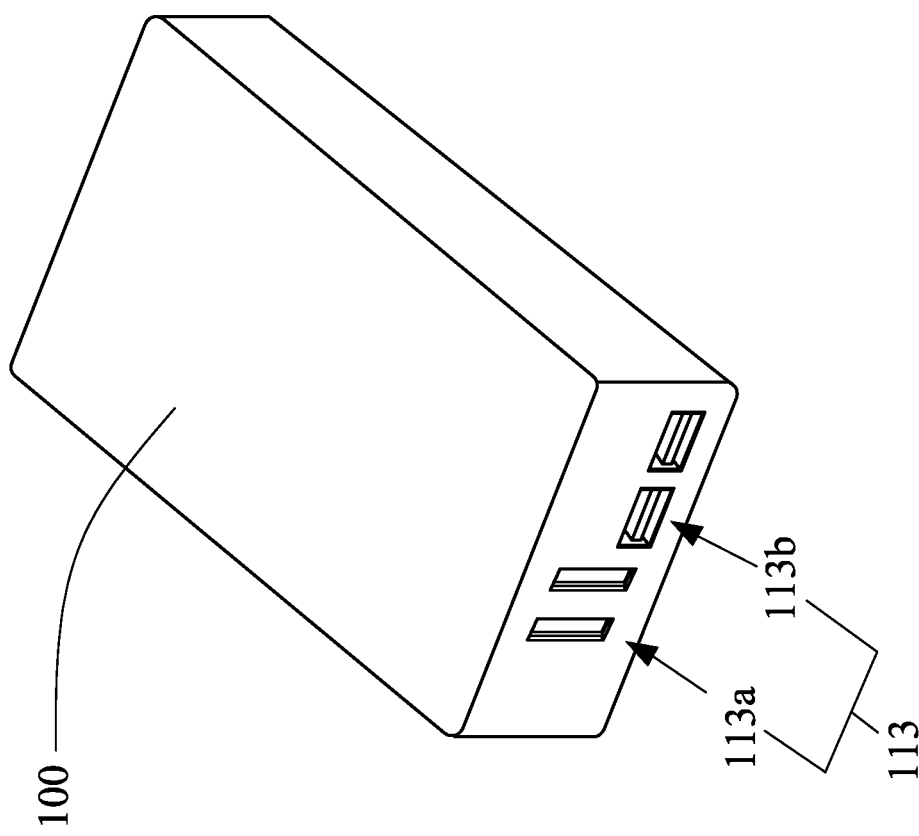
Figure 2A:
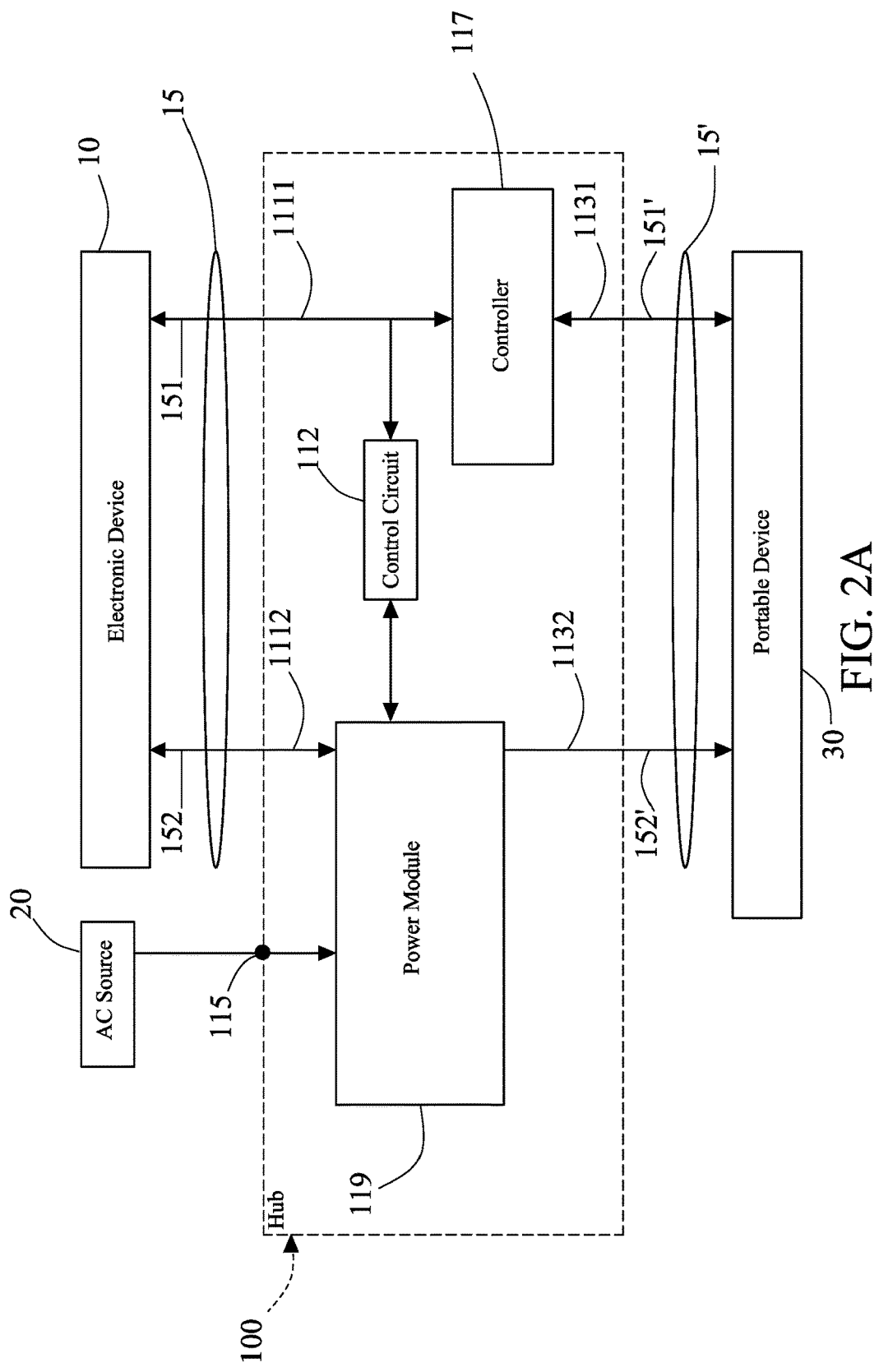
FIG. 2A is a schematic view of the framework of the hub in accordance with the first embodiment of the present invention.
Figure 9A:
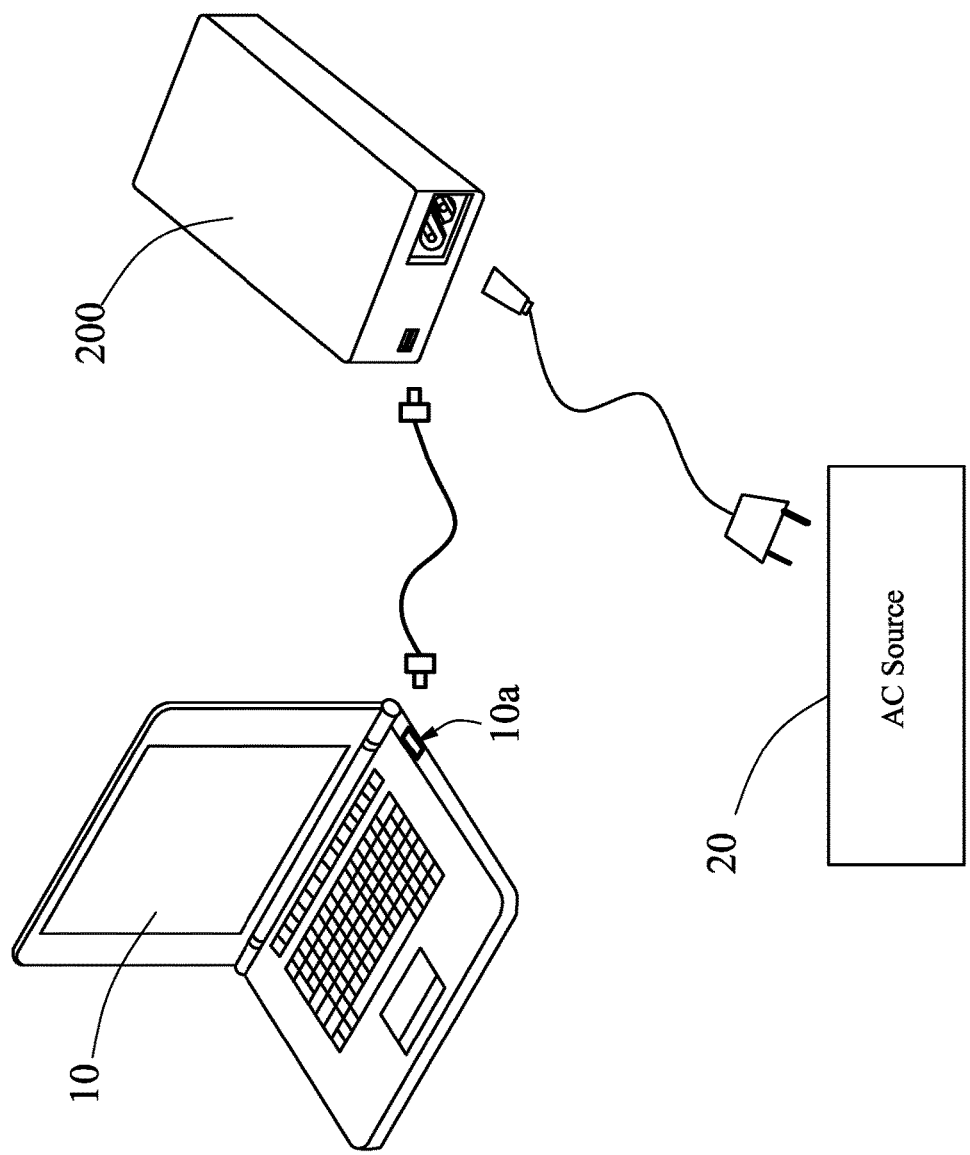

Please refer to FIG. 1A, FIG. 1B, and FIG. 2A. FIG. 1A and FIG. 1B are perspective views of a hub in accordance with a first embodiment of the present invention. FIG. 2A is a schematic view of the framework of the hub in accordance with the first embodiment of the present invention. A hub 100 includes a first connector 111 and at least one second connector 113. In this embodiment, the hub 100 includes four second connectors 113. Wherein, two of the four second connectors 113 are USB Type-A interfaces, and the other two of the four second connectors 113 are USB Type-C interfaces. Besides, the number and the form of the first connector 111 and the second connector 113 are not limited thereto. The hub 100 is electrically connected with a USB port 10*a* (as shown in FIG. 9A) of an electronic device 10 through the first connector 111 and a USB transmission line 15. For example, the USB port 10*a* is a USB interface, and the electronic device 10 is an AIO (All in one) PC, a desktop computer, or a notebook computer. Each second connector 113 enables the hub 100 to be electrically connected with a portable device 30. For example, the portable device 30 is a cell phone, a tablet computer, a card reader, a storage device, and the like. The electronic device 10 is electrically connected with the portable device 30 through the USB transmission line 15 and the hub 100 for interchanging data or charging. Furthermore, the hub 100 further includes a controller 117 therein. The controller 117 is electrically connected between the electronic device 10 and the portable device 30. In addition, the first connector 111 includes a first data transmission line 1111 and a first power line 1112. The second connector 113 includes a second data transmission line 1131 and a second power line 1132. In this embodiment, a signal transmission line 151 of the USB transmission line 15 is connected to the controller 117 through the first data transmission line 1111. The controller 117 is connected to the portable device 30 through the second data transmission line 1131 and a signal transmission line 151' of another USB transmission line 15'. The controller 117 and the portable device 30 transmit signals to each other for establishing a data transmission communication between the electronic device 10 and the portable device 30.

The controller 117 is able to send a signal to the portable device 30. The portable device 30 will start a quick charge mode after receiving the signal. In detail, the existing USB ports have three charging definitions, SDP, DCP and CDP. SDP is mainly used for data transmission. Its charging current is only standard 500 mA, so the charging rate is slower. DCP is mainly used for charging. Its maximum charging current is 1500 mA or more. But, it cannot be used for data transmission. CDP can be used for data transmission. Its maximum charging current is 1500 mA. The signal sent by the controller 117 enables the portable device 30 to start the quick charge mode for supporting CDP, such that quick charging and data transmission can be performed simultaneously. Besides, the controller 117 may also allow the portable device 30 to start the DCP mode only according to the demand. For example, if the hub 100 is connected to a voltage source (such as, a power bank or an indoor mains) without a data transmission function, instead of connecting to the USB port 10*a* of the electronic device 10, the controller 117 enables the portable device 30 to start the DCP mode.

As shown in FIG. 1A, FIG. 1B, and FIG. 2A, the hub 100 further includes a third connector 115 and a power module 119. The third connector 115 is electrically connected with an external AC source 20. The power module 119 is electrically connected with the first connector 111, the second connector 113, and the third connector 115. The power module 119 is adapted to supply the power outputted from the AC source 20 or the electronic device 10 to the portable device 30. In an embodiment, when the third connector 115 is not connected with the AC source 20 and the first connector 111 is electrically connected with the electronic device 10, the electronic device 10 will supply power to the portable device 30 through the power module 119. When the third connector 115 is connected with the AC source 20, the AC source 20 will supply power to the portable device 30 through the power module 119. In another embodiment, when the third connector 115 is connected with the AC source 20, the AC source 20 and the electronic device 10 will simultaneously supply power to the portable device 30.

Furthermore, in a preferable embodiment, the hub further includes a control circuit 112. The control circuit 112 is electrically connected between the first data transmission line 1111 and the power module 119. If the USB port 10*a* of the electronic device 10 supports a power supply mode and a charging mode, for example, the USB port 10*a* is a USB Type-C interface, the USB port 10*a* of the electronic device 10 can be switched to a power supply mode or a charging mode through the communication among the control circuit 112, the power module 119, and the electronic device 10. In detail, when the third connector 115 is not electrically connected with the AC source 20, the USB port 10*a* of the electronic device 10 is in the power supply mode so that the control circuit 112 and the controller 117 can operate and the control circuit 112 communicates with the power module 119. The control circuit 112 can inform the electronic device 10 of the present state of the power module 119 all the time. When the power module 119 is electrically connected with the AC source 20, the control circuit 112 will instruct the electronic device 10 to stop the power supply mode. After that, the control circuit 112 instructs the power module 119 to adjust and output voltage to the first connector 111, and then instructs the electronic device 10 to actuate the internal switch (not shown) for switching the USB port 10*a* to the charging mode. When the power module 119 is not electrically connected with the AC source 20, the control circuit 112 will instruct the electronic device 10 to stop the charging mode of the USB port 10*a*. After that, the control circuit 112 instructs the power module 119 to interrupt the power supply of the first connector 111, and then instructs the electronic device 10 to actuate the internal switch (not shown) for switching the USB port 10*a* to the power supply mode.

Figure 2B:
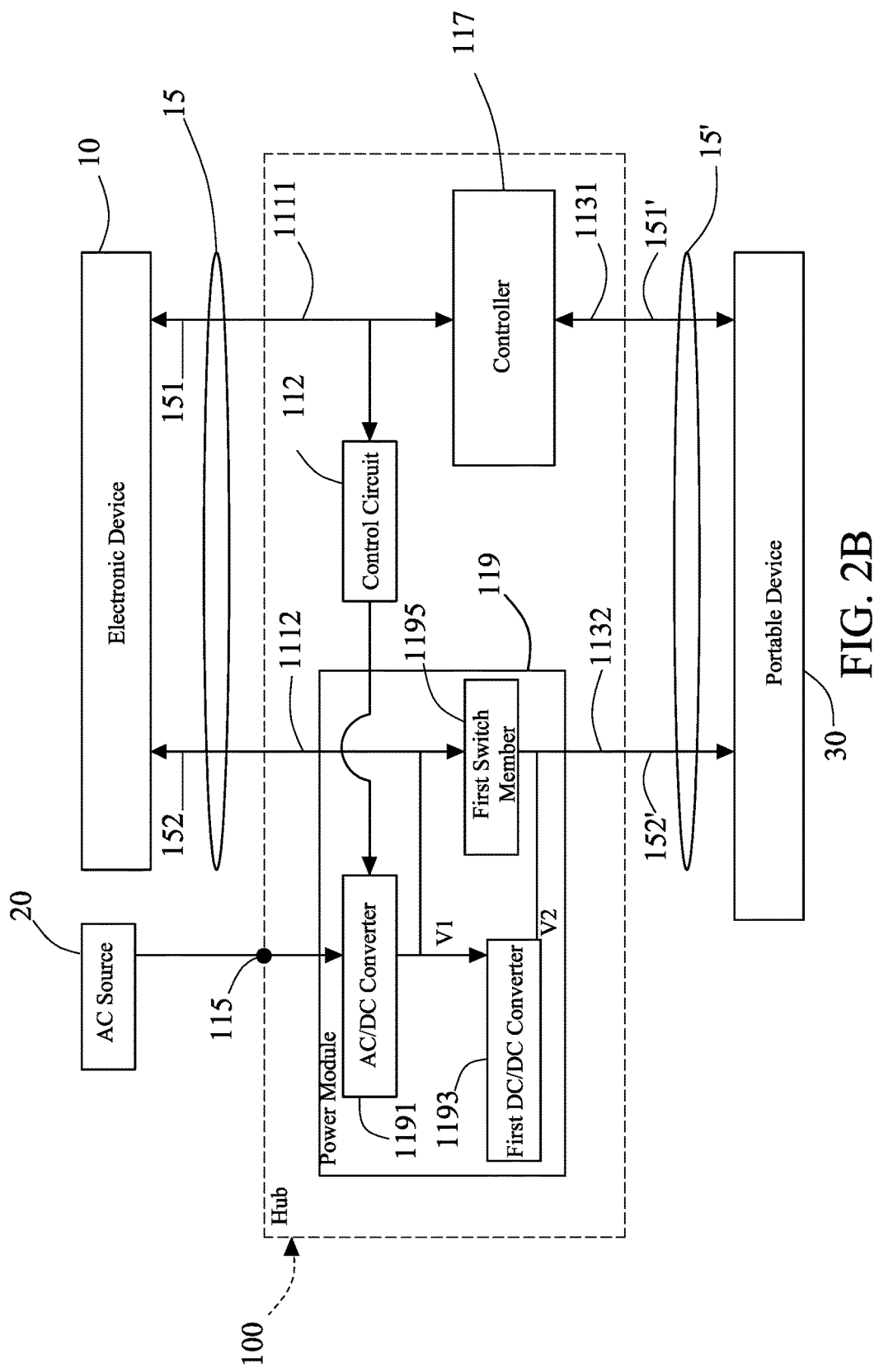
FIG. 2B is a schematic view of the framework of the hub in accordance with a second embodiment of the present invention.

Next, please refer to FIG. 1A, FIG. 1B, and FIG. 2B. FIG. 2B is a schematic view of the framework of the hub in accordance with a second embodiment of the present invention. In this embodiment, the power module 119 includes an AC/DC converter 1191, a first DC/DC converter 1193, and a first switch member 1195. An input end of the AC/DC converter 1191 is electrically connected with the AC source 20 through the third connector 115. Another input end of the AC/DC converter 1191 is electrically connected with the control circuit 112. The control circuit 112 can adjust the output voltage V1 of the AC/DC converter 1191. The voltage V1 may be 5V, 9V, 12V, 15V, 20V and so on, or the other voltage values. Besides, an input end of the first DC/DC converter 1193 is electrically connected with the AC/DC converter 1191, and an output end of the first DC/DC converter 1193 is electrically connected with the portable device 30. The first switch member 1195 is electrically connected between the first power line 1112 of the first connector 111 and the second power line 1132 of the second connector 113.

The power module 119 may be provided with a detecting circuit (not shown in the drawings) to detect whether it has been electrically connected with the AC source 20 or not. When the detecting circuit detects that the third connector 115 is electrically connected with the AC source 20, the first switch member 1195 will be opened (not electrically conducted), such that the first power line 1112 and the second power line 1132 are not electrically connected and the USB port 10a of the electronic device 10 is switched to the charging mode. In this embodiment, the output voltage of the AC source 20 may be in the range of 100 VAC-240 VAC. The output voltage V1 of the AC/DC converter 1191 is adjusted by the control circuit 112. For example, the control circuit 112 can be informed the required voltage of the electronic device 10 is 20V via the first data transmission line 1111 and adjust the output voltage V1 of the AC/DC converter 1191 to be 20V for supplying power to the electronic device 10. Besides, the output voltage V2 of the first DC/DC converter 1193 may be 5V for supplying power to the portable device 30.

When the third connector 115 is not electrically connected with the AC source 20, the first switch member 1195 will be closed (namely, in a conduction state), such that the USB port 10a of the electronic device 10 is switched to the power supply mode, as a result, the first power line 1112 and the second power line 1132 are electrically connected so that the electronic device 10 supplies power to the portable device 30.

Figure 3A:
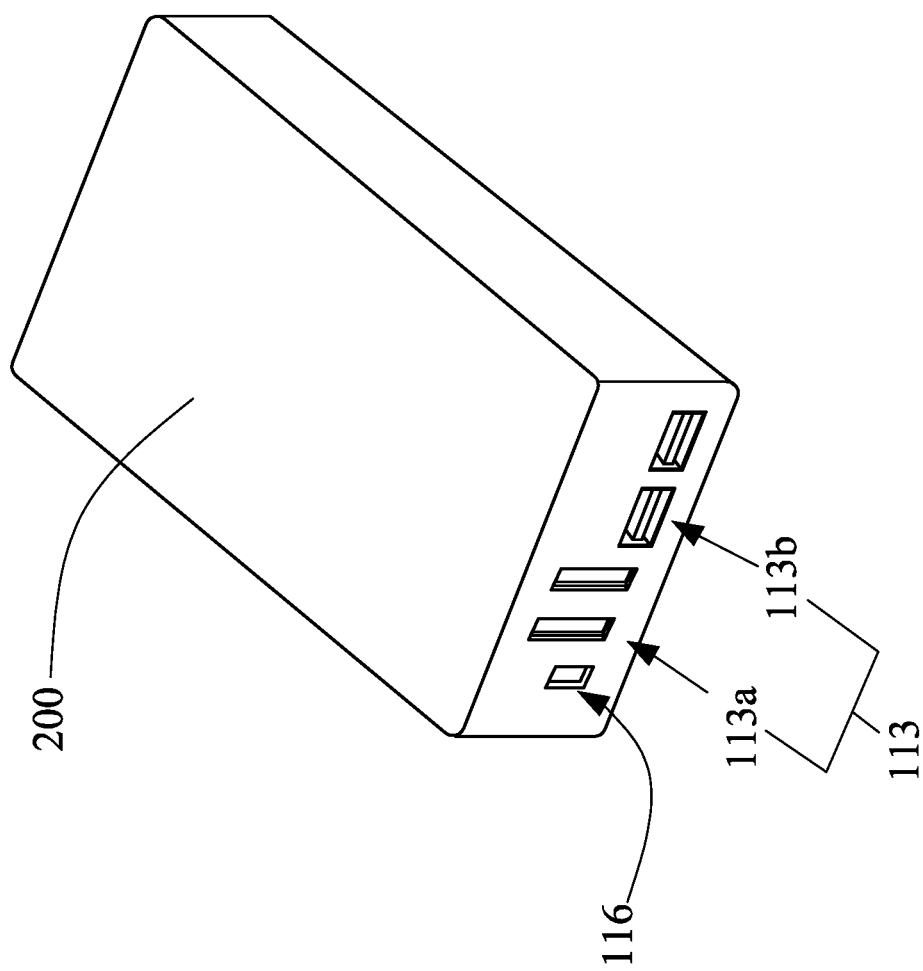
FIG. 3A and FIG. 3B are perspective views of the hub in accordance with a third embodiment of the present invention.
Figure 3B:
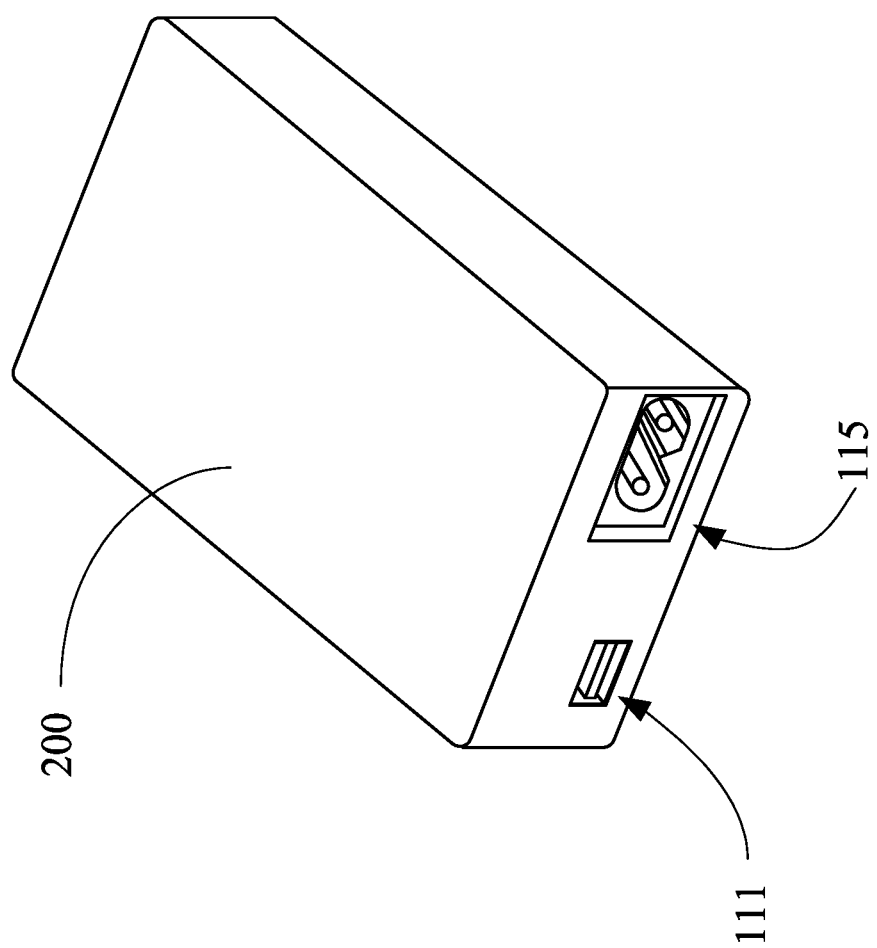
Figure 4A:
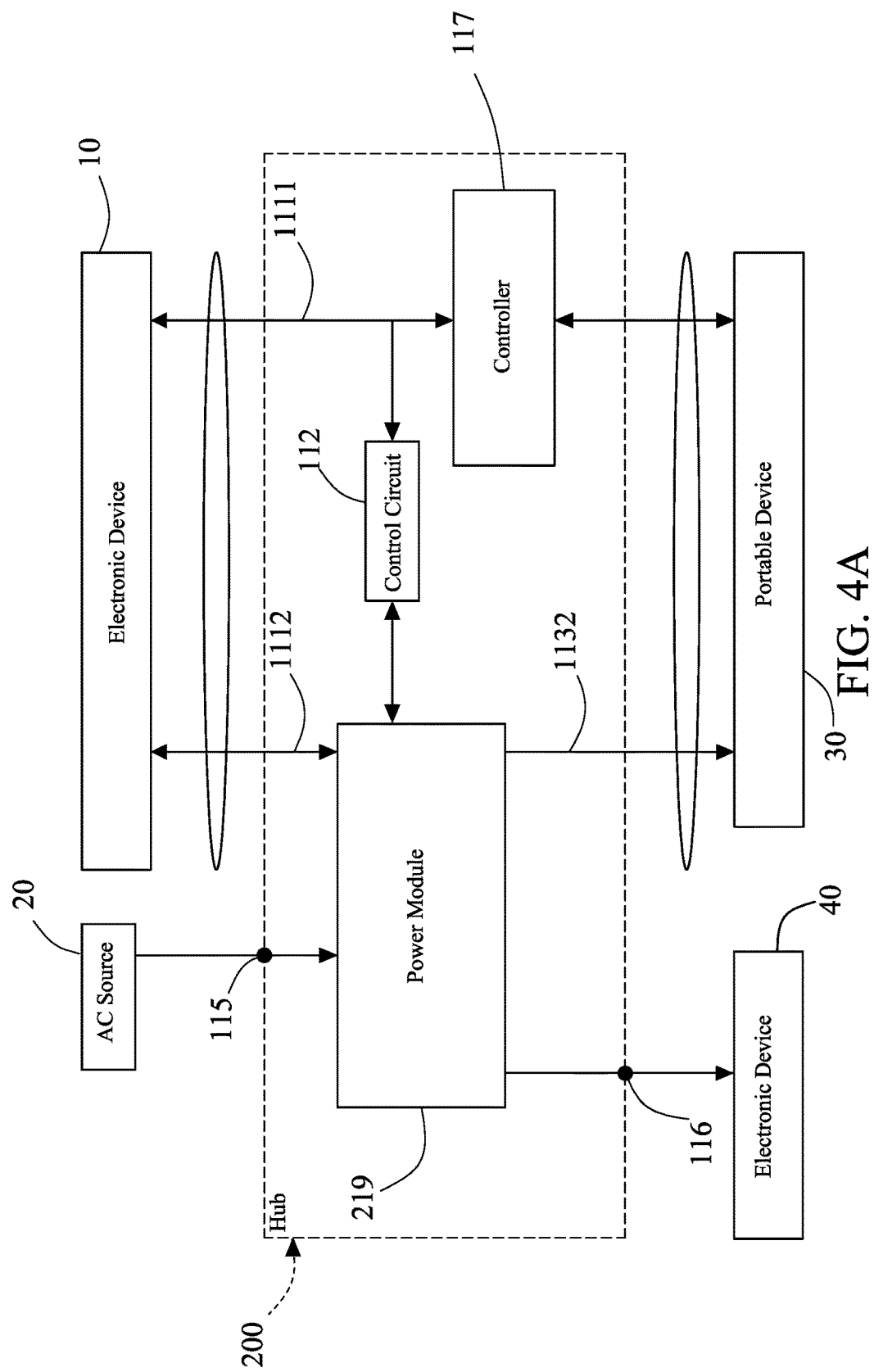
FIG. 4A and FIG. 4B are schematic views of the framework of the hub in accordance with the third embodiment of the present invention.
Figure 4B:
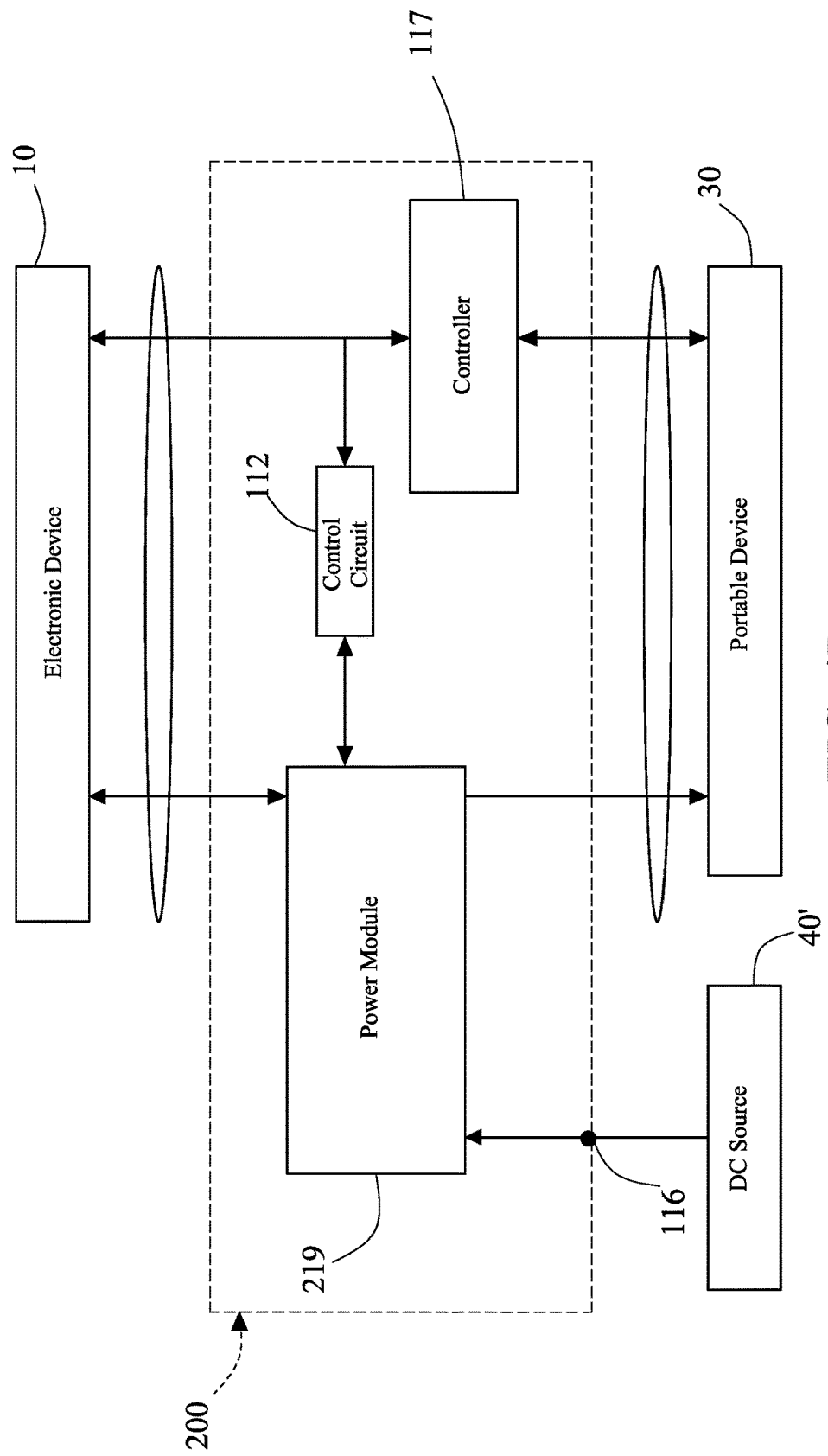

Please refer to FIG. 3A, FIG. 3B, and FIG. 4A. FIG. 3A and FIG. 3B are perspective views of the hub in accordance with a third embodiment of the present invention. FIG. 4A is a schematic view of the framework of the hub in accordance with the third embodiment of the present invention. Compared to the hub 100 of the first embodiment, the hub 200 of this embodiment further comprises a fourth connector 116. The fourth connector 116 is electrically connected with another electronic device 40 which is located in the outside environment. The fourth connector 116 in the hub 200 is electrically connected with the power module 219. The fourth connector 116 is electrically connected with the electronic device 40. The power module 219 supplies the power outputted from the AC source 20 to the electronic device 40. The required input voltage of the electronic device 40 is different from that of the portable device 30. The electronic device 40 may be a tablet computer, a notebook computer, or an AIO (All in one) PC. Referring to FIG. 4B, when the fourth connector 116 is electrically connected with a DC source 40' and the third connector 115 is not electrically connected with the AC source 20, the power module 219 supplies the power outputted from the DC source 40' to the electronic device 10 or the portable device 30. The DC source 40' may be a charging stand of a car battery, and its output voltage is 12V or 24V.

Figure 4C:
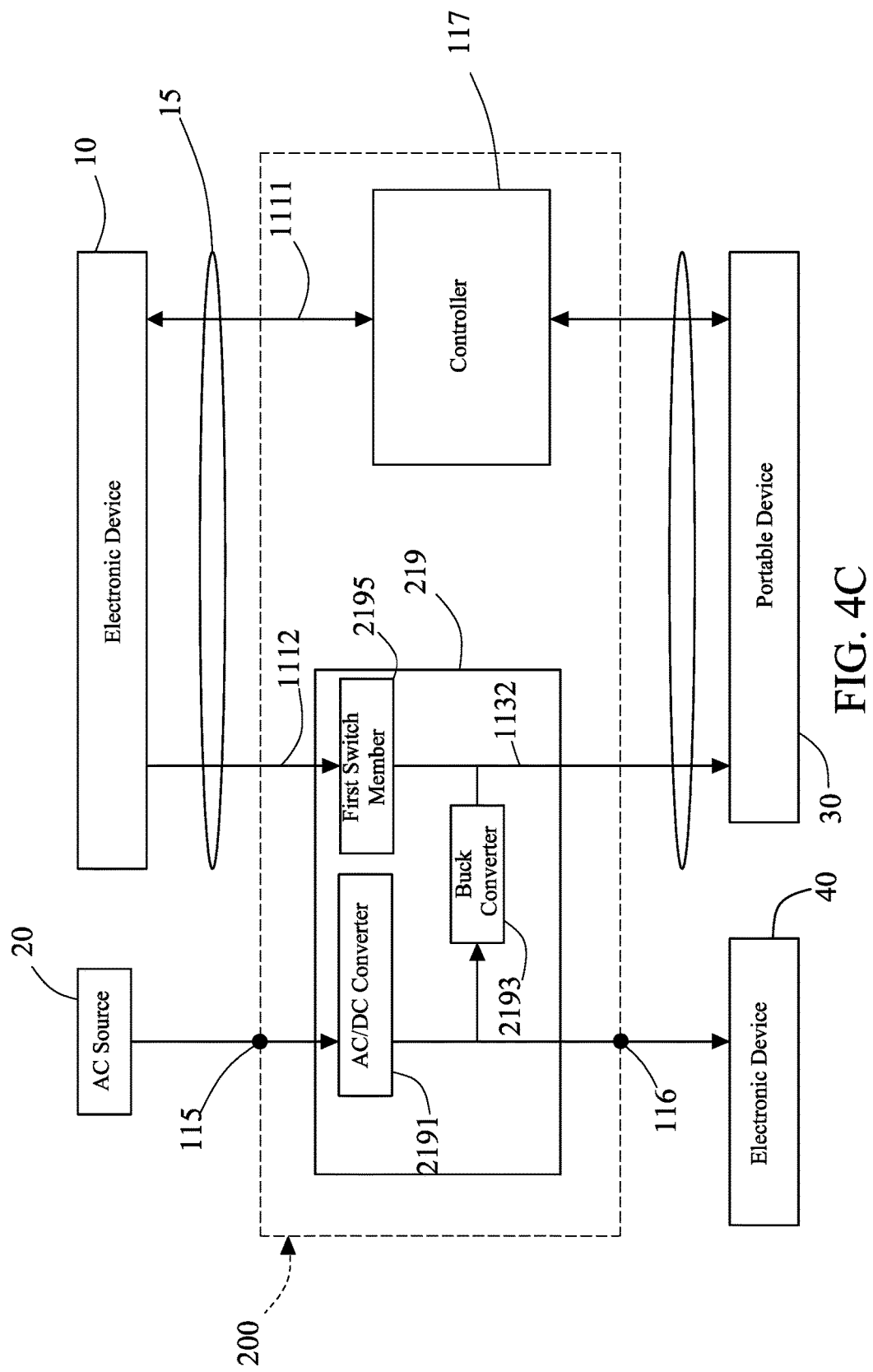
FIG. 4C is a schematic view of the framework of the hub in accordance with a fourth embodiment of the present invention.

Please refer to FIG. 3A, FIG. 3B, and FIG. 4C. FIG. 4C is a schematic view of the framework of the hub in accordance with a fourth embodiment of the present invention. In this embodiment, the power module 219 includes an AC/DC converter 2191, a buck converter 2193, and a first switch member 2195. The fourth connector 116 is electrically connected with the electronic device 40. The third connector 115 is electrically connected with the AC source 20. The USB port 10a (as shown in FIG. 9A) of the electronic device 10 only provides the power supply mode. An input end of the AC/DC converter 2191 is electrically connected with the AC source 20 through the third connector 115. The output voltage V1 of the AC/DC converter 2191 can be as the input voltage of the electronic device 40. An input end of the buck converter 2193 is electrically connected with the AC/DC converter 2191, and an output end of the buck converter 2193 is electrically connected with the portable device 30. Besides, the first switch member 2195 is electrically connected between the first power line 1112 and the second power line 1132. In this embodiment, the first switch member 2195 is in a disconnection state. The electronic device 10 is not electrically connected with the portable device 30. The AC source 20 supplies power to the electronic device 40 and the portable device 30. In other embodiments, the fourth connector 116 is electrically connected with a DC source 40', and the third connector 115 is not electrically connected with the AC source 20 (as shown in FIG. 4B). The DC source 40' outputs its power to the portable device 30 through the buck converter 2193.

Figure 4D:
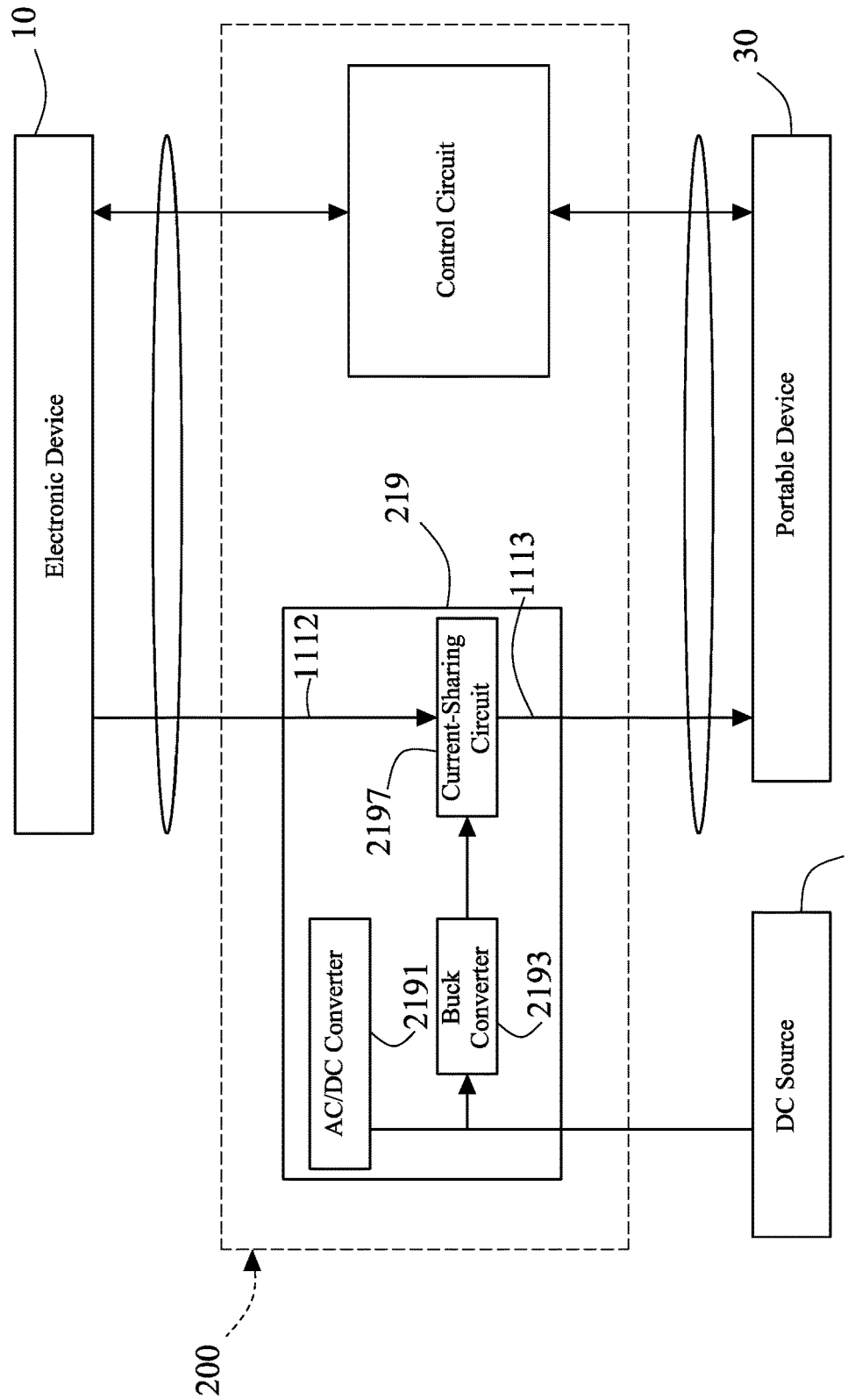
FIG. 4D is a schematic view of the framework of the hub in accordance with a fifth embodiment of the present invention.

Please refer to FIG. 4D. FIG. 4D is a schematic view of the framework of the hub in accordance with a fifth embodiment of the present invention. In this embodiment, the power module 219 includes an AC/DC converter 2191, a buck converter 2193, and a current-sharing circuit 2197. The fourth connector 116 is electrically connected with the electronic device 40'. The third connector 115 is not electrically connected with the AC source 20. The USB port 10a (as shown in FIG. 9A) of the electronic device 10 only provides the power supply mode. The current-sharing circuit 2197 is electrically connected between the first power line 1112 and the second power line 1132. Through the current-sharing circuit 2197, the electronic device 10 and the DC source 40' will simultaneously supply power to the portable device 30. In this way, the portable device 30 won't stop running or lose transmission in case one of the electronic device 10 and the DC source 40' doesn't supply power. With the current-sharing circuit 2197, the priority and ratio of the power supply from the electronic device 10 and the DC source 40' can be set, such that the portable device 30 can utilize the maximum power source abundantly. Regarding the practice of the current-sharing circuit 2197, please refer to FIG. 4A and the related description of U.S. patent application Ser. No. 14/992,130.

Figure 5A:
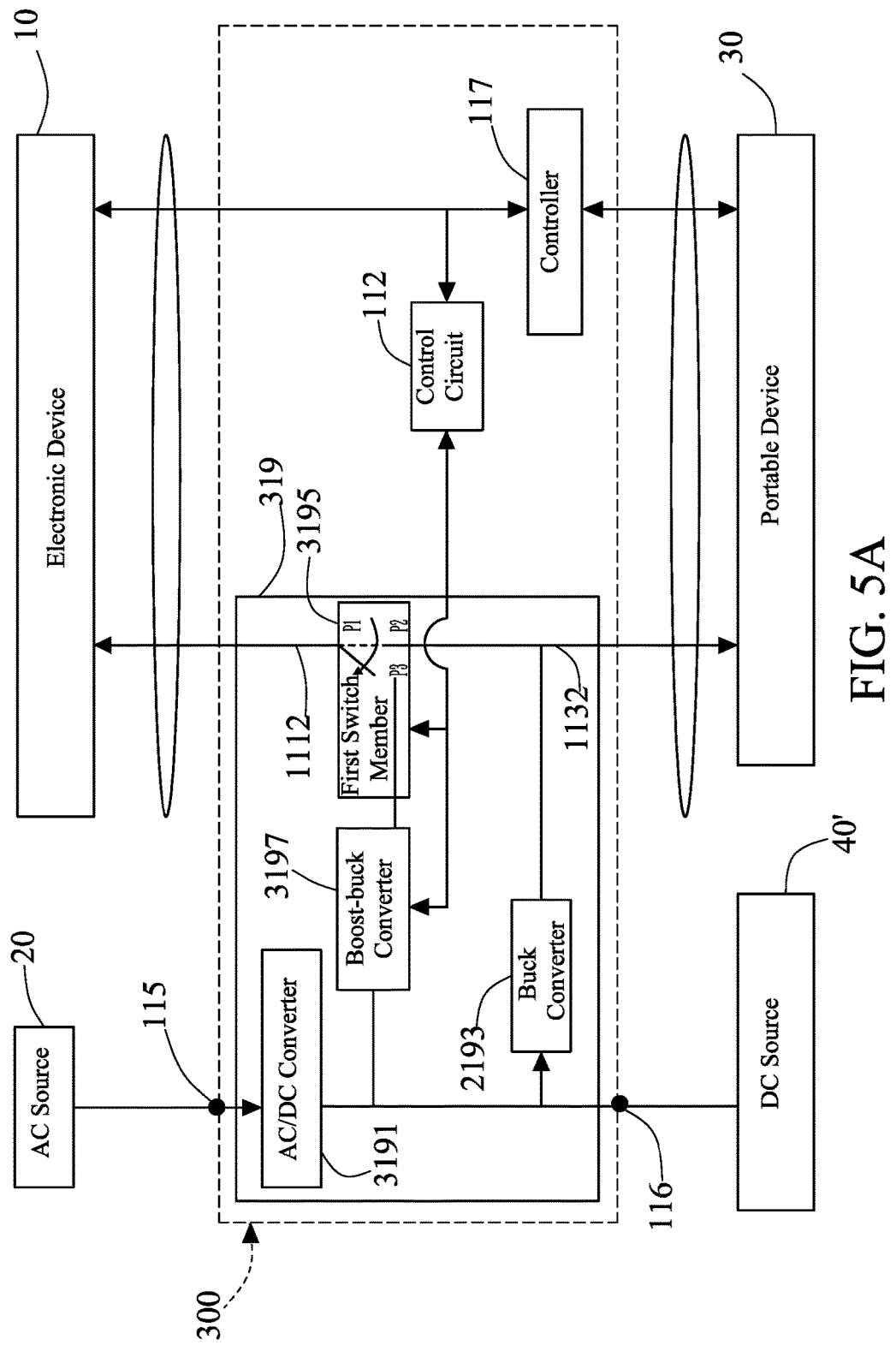
FIG. 5A is a schematic view of the framework of the hub in accordance with a sixth embodiment of the present invention.

FIG. 5A is a schematic view of the framework of the hub in accordance with a sixth embodiment of the present invention. In this embodiment, the power module 319 of a hub 300 includes an AC/DC converter 2191, a buck converter 2193, a first switch member 3195, and a boost-buck converter 3197. The first switch member 3195 includes a first terminal P1, a second terminal P2, and a third terminal P3. The first terminal P1 is electrically connected with the first power line 1112. The second terminal P2 is electrically connected with the second power line 1132. An input end of the boost-buck converter 3197 is electrically connected with the AC/DC converter 2191. An output end of the boost-buck converter 3197 is electrically connected with the third terminal P3 of the first switch member 3195. The control circuit 112 is electrically connected with the first switch member 3195 and the boost-buck converter 3197. The control circuit 112 can adjust the output voltage of the boost-buck converter 3197. In this embodiment, the USB port 10a of the electronic device 10 provides the power supply mode and the charging mode. The boost-buck converter 3197 of this embodiment is a boost-buck converter. That is to say, the output voltage of the boost-buck converter 3197 can be less than the input voltage of the boost-buck converter 3197 or greater than the input voltage.

Referring to FIG. 5A, when the third connector 115 is electrically connected with the AC source 20 or the fourth connector 116 is electrically connected with the DC source 40', the first terminal P1 of the first switch member 3195 is connected with the third terminal P3. In detail, the required voltage of the electronic device 10 is assumed to be 15V. When the third connector 115 is electrically connected with the AC source 20 (but the fourth connector 116 is not electrically connected with the DC source 40') and if the output voltage of the AD/DC converter 2191 is 20V, the control circuit 112 will adjust the output voltage of the boost-buck converter 3197 to be 15V and supply the required power to the electronic device 10 through the first switch member 3195. That is to say, the boost-buck converter 3197 brings a buck function. When the fourth connector 116 is electrically connected with the DC source 40' (but the third connector 115 is not electrically connected with the AC source 20) and if the output voltage of DC source 40' is 12V, the control circuit 112 will adjust the output voltage of the boost-buck converter 3197 to be 15V. That is to say, the boost-buck converter 3197 brings a boost function. In other embodiments, the required voltage of the electronic device 10 is assumed to be 20V. When the third connector 115 is electrically connected with the AC source 20 (but the fourth connector 116 is not electrically connected with the DC source 40') and if the output voltage of the AD/DC converter 2191 is 20V, the control circuit 112 could be also provided with a switch circuit (not shown in the drawings) which is connected with the boost-buck converter 3197 in parallel and in a connection state for the boost-buck converter 3197 to supply the required power to the electronic device 10 through the first switch member 3195.

When the third connector 115 is not electrically connected with the AC source 20 and the fourth connector 116 is not electrically connected with the DC source 40', the first terminal P1 of the first switch member 3195 is connected with the second terminal P2. That is to say, both the AC source 20 and the DC source 40' are not electrically with the power module 319. The electronic device 10 supplies power to the portable device 30.

Figure 5B:
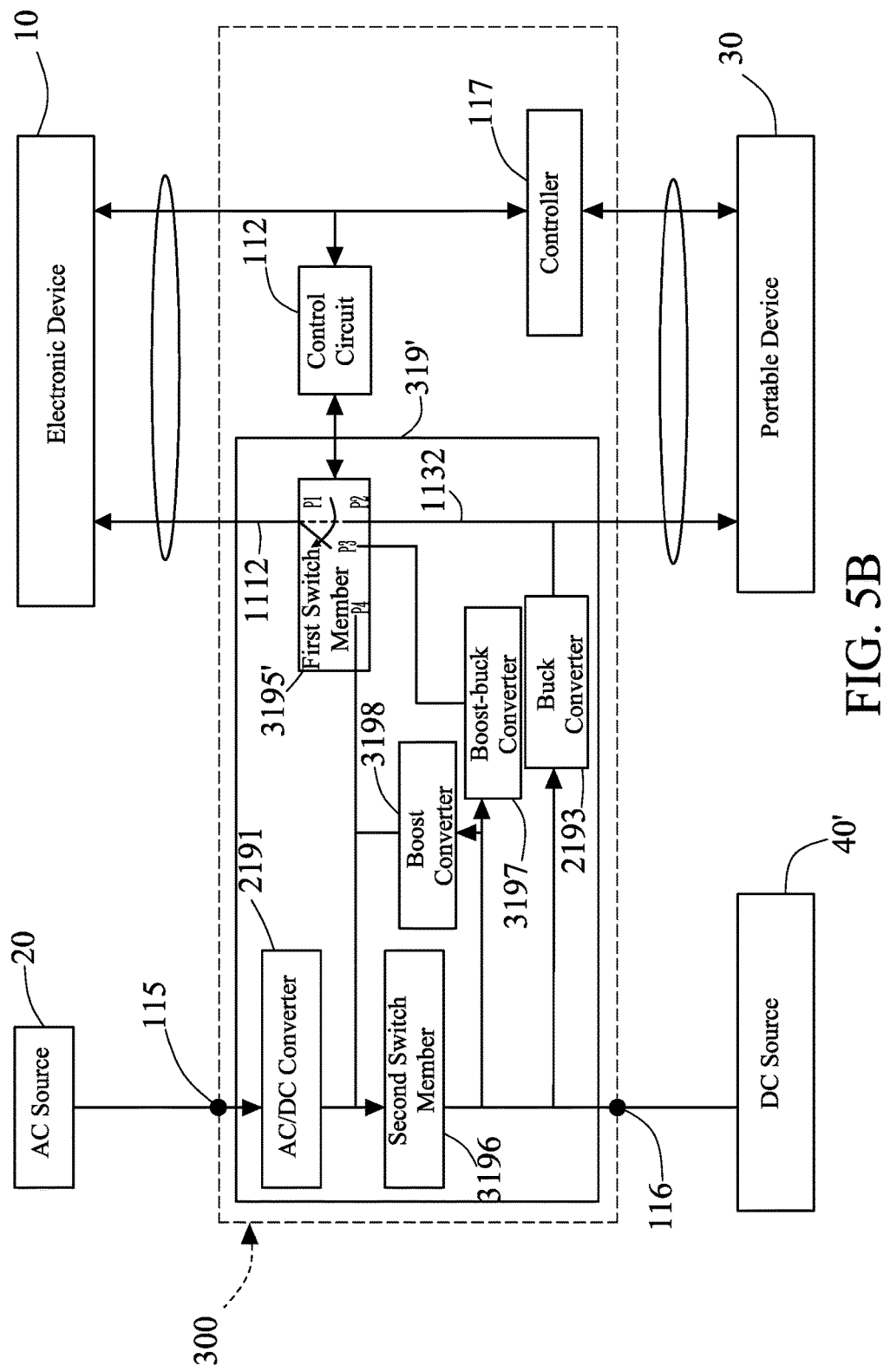
FIG. 5B is a schematic view of the framework of the hub in accordance with a seventh embodiment of the present invention.

FIG. 5B is a schematic view of the framework of the hub in accordance with a seventh embodiment of the present invention. In this embodiment, the power module 319' includes an AC/DC converter 2191, a buck converter 2193, a first switch member 3195', a second switch member 3196, a boost-buck converter 3197, and a boost converter 3198. The second switch member 3196 is electrically connected between the AC/DC converter 2191 and the fourth connector 116 for controlling the connection state of the AC/DC converter 2191 and the fourth connector 116. An input end of the buck converter 2193 is electrically connected with the second switch member 3196. An output end of the buck converter 2193 is electrically connected with the portable device 30. The first switch member 3195' includes a first terminal P1, a second terminal P2, a third terminal P3, and a fourth terminal P4. The first terminal P1 is electrically connected with the first power line 1112. The second terminal P2 is electrically connected with the second power line 1132. The fourth terminal P4 is electrically connected with the AC/DC converter 2191. The control circuit 112 is electrically connected with the first switch member 3195'. The control circuit 112 controls the first terminal P1 of the first switch member 3195' to be electrically connected with one of the second terminal P2, the third terminal P3, and the fourth terminal P4. An input end of the boost-buck converter 3197 is electrically connected with the second switch member 3196. An output end of the boost-buck converter 3197 is electrically connected with the third terminal P3 of the first switch member 3195'. An input end of the boost converter 3198 is electrically connected with the second switch member 3196. An output end of the boost converter 3198 is electrically connected with the fourth terminal P4 of the first switch member 3195'.

Referring to FIG. 5B, in this embodiment, the output voltage of the boost converter 3198 is 20V, the output voltage of the boost-buck converter 3197 is 15V, and the output voltage of the buck converter 2193 is 5V. The control circuit 112 controls the first terminal P1 to be electrically connected with one of the second terminal P2, the third terminal P3, and the fourth terminal P4 according to the data from the electronic device 10. When the required input voltage of the electronic device 10 is 20V, the first terminal P1 is electrically connected with the fourth terminal P4. When the required input voltage of the electronic device 10 is 15V, the first terminal P1 is electrically connected with the third terminal P3. When the third connector 115 is electrically connected with the AC source 20, the second switch member 3196 will be closed (namely, in a conduction state). The AC source 20 supplies power to the electronic device 10 and the portable device 30, even the electronic device 40 (if the fourth connector 116 is electrically connected with the electronic device 40). When the fourth connector 116 is electrically connected with the DC source 40', the second switch member 3196 will be in a disconnection state and the DC source 40' supplies power to the electronic device 10 and the portable device 30. When the third connector 115 is not electrically connected with the AC source 20 and the fourth connector 116 is not electrically connected with the DC source 40', the first terminal P1 of the first switch member 3195' is connected with the second terminal P2 and the electronic device 10 supplies power to the portable device 30. As shown in FIG. 5B, the output voltage of the boost-buck converter 3197 is a fixed voltage, but the output voltage of the boost-buck converter 3197 may be adjustable. For example, it can be adjusted to 9V or 12V.

Figure 6:
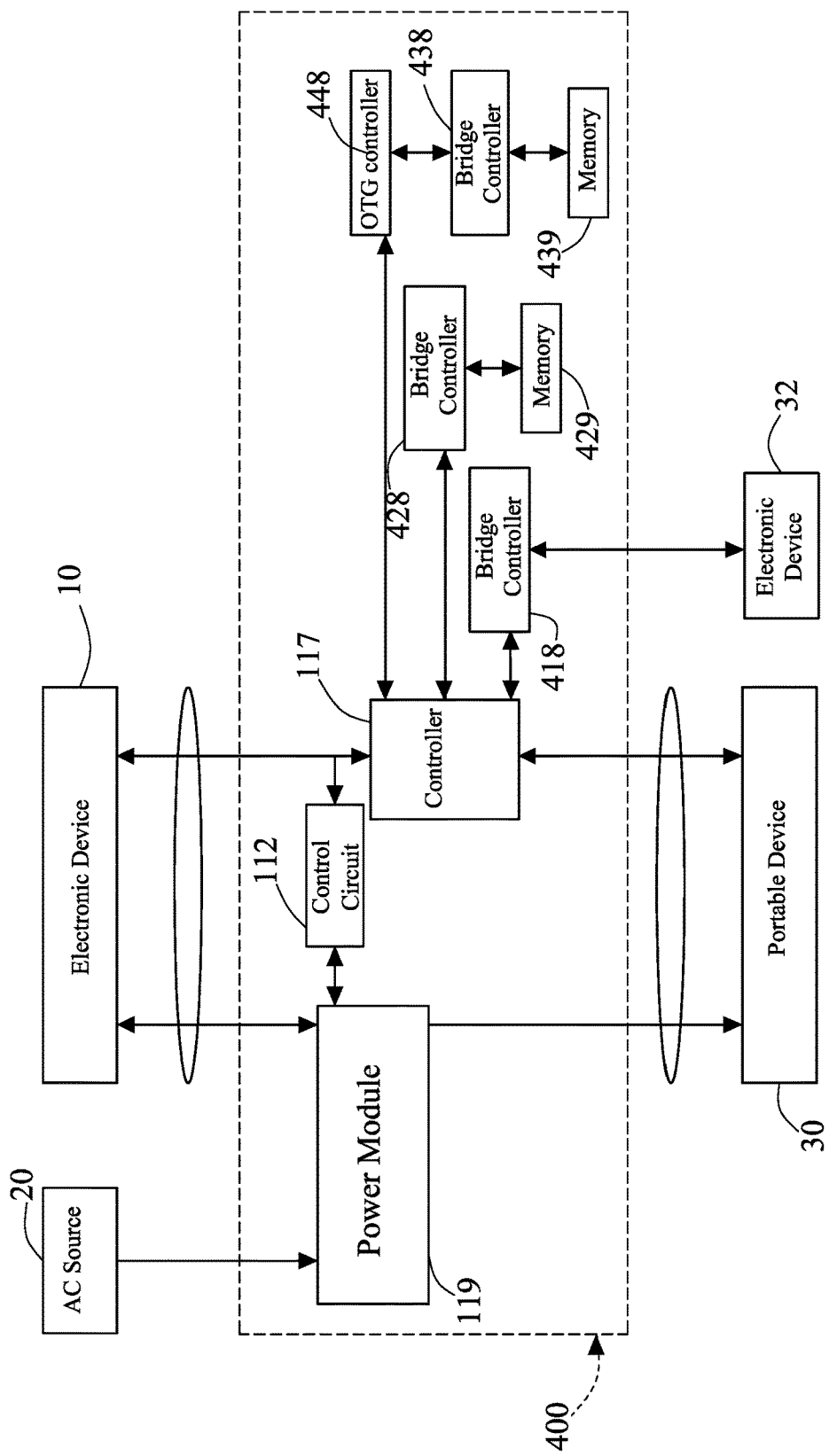
FIG. 6 is a schematic view of the framework of the hub in accordance with an eighth embodiment of the present invention.

FIG. 6 is a schematic view of the framework of the hub in accordance with an eighth embodiment of the present invention. Compared to the hub 100 of FIG. 2A, the hub 400 of this embodiment includes a plurality of bridge controllers 418, 428, 438. The bridge controllers 418, 428, 438 are electrically connected with the controller 117. The bridge controllers 418, 428, 438 are adapted for transformation of signals in different formats. For example, the bridge controller 418 is able to transform the output signal of the controller 117 into another signal in a different format, and then the signal is transmitted to an external electronic device 32, such as a card reader, a VGA port, or an HDMI port. The bridge controller 428 is connected with a memory 429. The memory 429 is disposed in the hub 400, such that the hub 400 provides a data storage function as a portable hard disk. The hub 400 further includes an OTG (On-The-Go) controller 448. The OTG controller 448 is electrically connected with the controller 117. The bridge controller 438 is electrically connected between the OTG controller 448 and a memory 439. The OTG controller 448 is to support the standard of USB On-The-Go. Thus, the memory 439 and the portable device 30 can perform data transmission directly, without the other computer apparatus.

Figure 7:
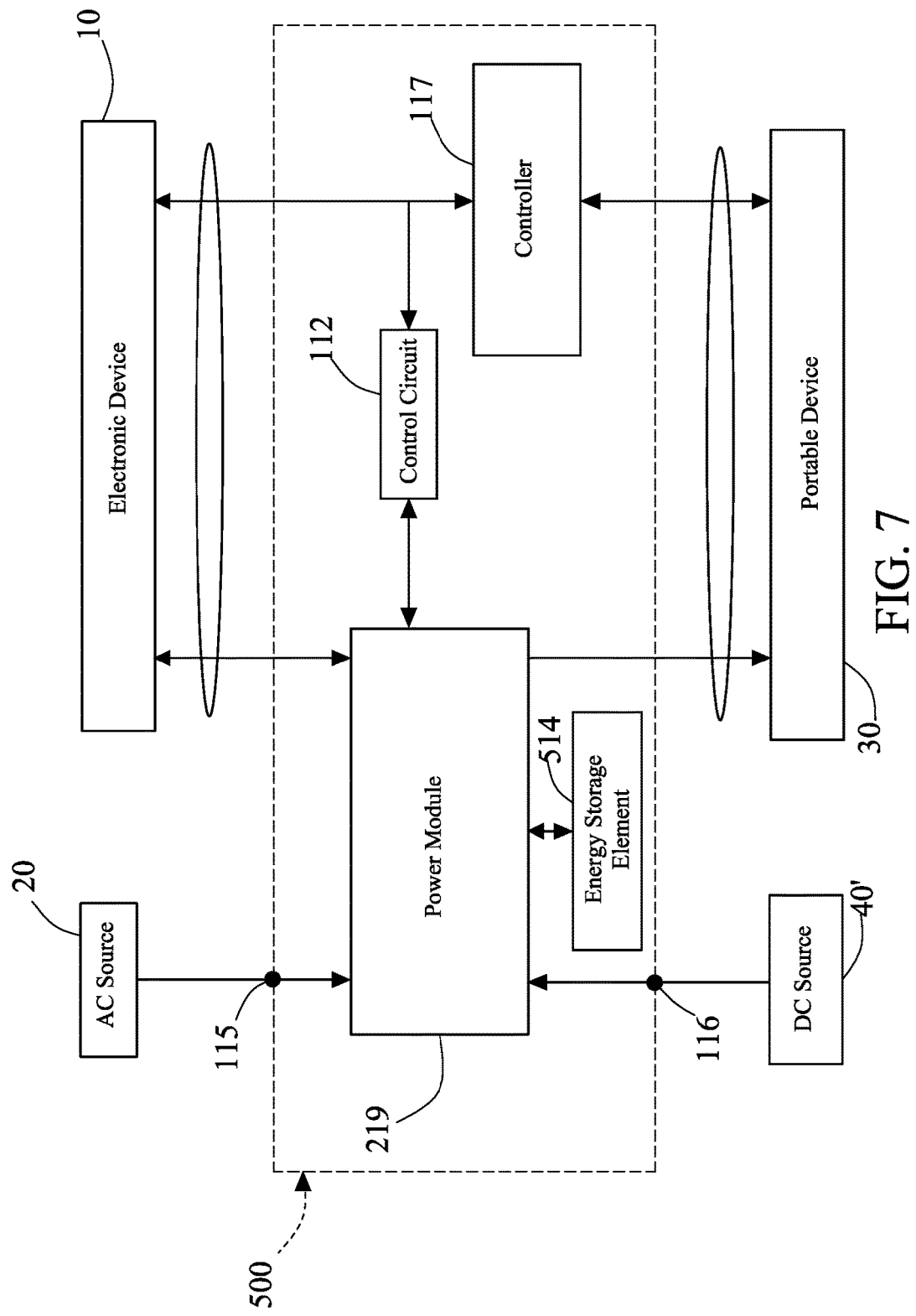
FIG. 7 is a schematic view of the framework of the hub in accordance with a ninth embodiment of the present invention.

FIG. 7 is a schematic view of the framework of the hub in accordance with a ninth embodiment of the present invention. Compared to the hub 200 of FIG. 4B, the hub 500 of this embodiment further includes an energy storage element 514. The energy storage element 514 is electrically connected with the power module 219. When the third connector 115 is electrically connected with the AC source 20 and the fourth connector 116 is electrically connected with the DC source 40', the energy storage element 514 is in the charging mode. On the contrary, when the third connector 115 is not electrically connected with the AC source 20 and the fourth connector 116 is not electrically connected with the DC source 40', the energy storage element 514 is in the power supply mode. The hub 500 of this embodiment can be used as a power bank. In this embodiment, the energy storage element 514 is located outside the power module 219, but the energy storage element 514 may be disposed in the power module 219. In this embodiment, the energy storage element 514 may be a battery or a capacitor.

Figure 8:
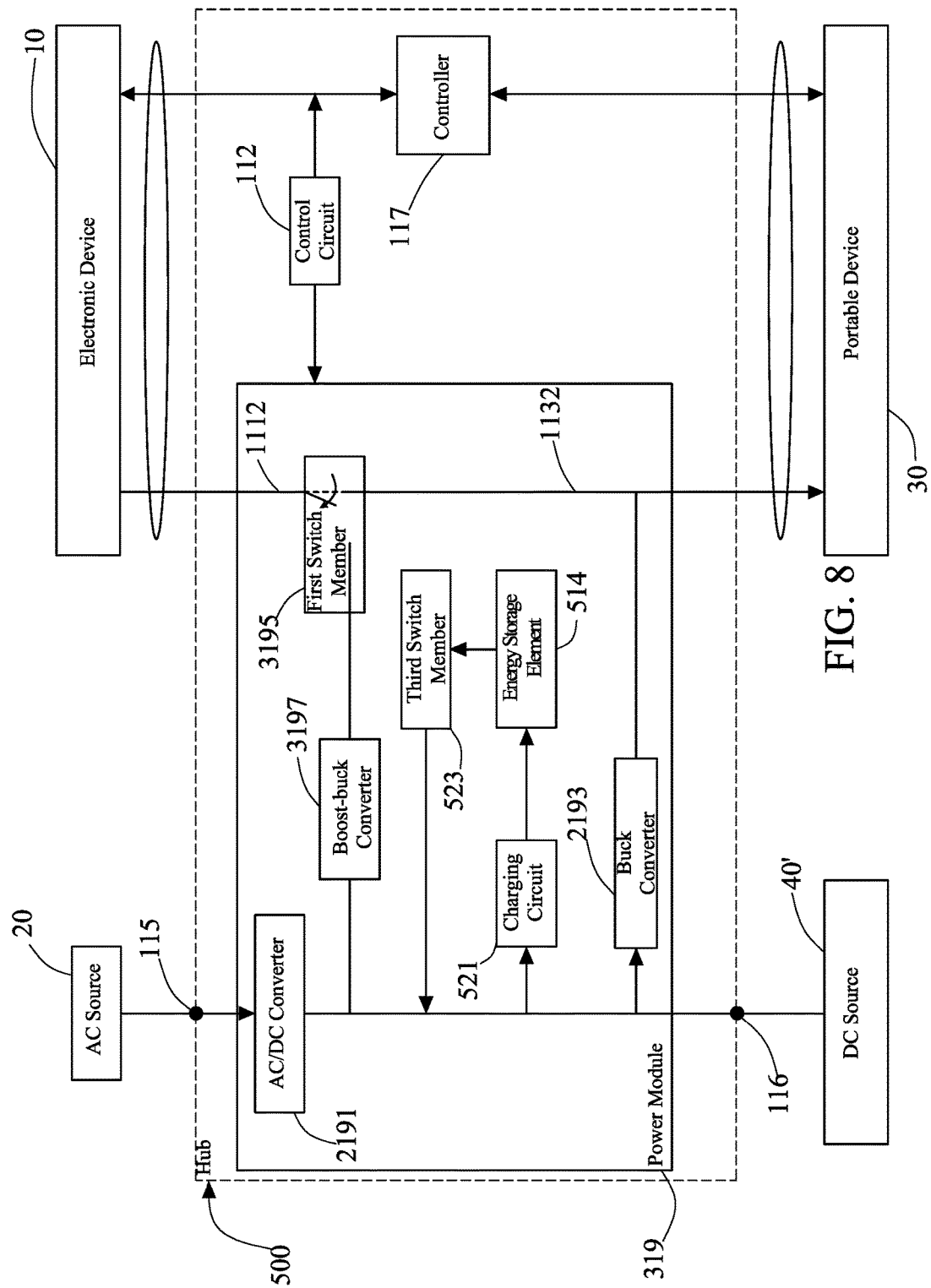
FIG. 8 is a schematic view of the framework of the hub in accordance with a tenth embodiment of the present invention.

FIG. 8 is a schematic view of the framework of the hub in accordance with a tenth embodiment of the present invention. In this embodiment, the hub 500' further includes an energy storage element 514, a charging circuit 521, and a third switch member 523. An input end of the charging circuit 521 is electrically connected with the AC/DC converter 2191, and an output end of the charging circuit 521 is electrically connected with the energy storage element 514. An input end of third switch member 523 is electrically connected with the energy storage element 514, and an output end of third switch member 523 is electrically connected with the boost-buck converter 3197 and the buck converter 2193. When the third connector 115 is electrically connected with the AC source 20 or the fourth connector 116 is electrically connected with the DC source 40', the third switch member 523 is disconnected and the charging circuit 521 is to charge the energy storage element 514. When the third connector 115 is not electrically connected with the AC source 20 and the fourth connector 116 is not electrically connected with the DC source 40', the third switch member 523 is connected for the energy storage element 514 to be in the power supply mode. The energy storage element 514 supplies power to the portable device 30 through the buck converter 2193, and supplies power to the electronic device 10 through the boost-buck converter 3197.

FIG. 9A and FIG. 9B are schematic views of the hub of the present invention in practical use. The hub hereto is the hub 200 of the third embodiment. The electronic device 10 is a notebook. Through the hub 200, the electronic device 10 needs only a USB 3.1 PD (Power Delivery) type C port 10a to connect a TV 8, a portable device 30, a SD card 6, and a portable hard disk 4 for signal communication; or the hub 200 may supply power to the TV 8, the portable device 30, and the portable hard disk 4; or the hub 200 may supply the power from the AC source 20 to the electronic device 10 or the other devices; or the hub 200 converts the power source (namely, the DC source 40') of a car or an airplane into the required power of the portable devices, a notebook, or the like through a car-cigarette 2; or the hub 200 is used to supply the required power of various equipments through the power bank 3 to be electrically connected with the fourth connector 116. Thereby, the number and type of the USB ports of the hub 200 and the electronic device 10 can be decreased and standardized. Thus, the type and specification of the hub 200 also can be standardized. Consumers have various choices and combinations of the electronic device 10 and the hub 200, so it is more flexible, cheaper and more convenient for purchase.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hub, electrically connected with an electronic device, an alternating current (AC) source, and at least one portable device which are located in the outside environment, the electronic device comprising a Universal Serial Bus (USB) port, the hub comprising:
   a first connector, electrically connected with the Universal Serial Bus (USB) port of the electronic device, the first connector comprising a first data transmission line and a first power line;
   at least one second connector, electrically connected with the portable device, the second connector comprising a second data transmission line and a second power line;
   a third connector, electrically connected with the alternating current (AC) source;
   a power module, electrically connected with the first connector, the second connector, and the third connector, the power module supplying power outputted from the alternating current (AC) source or the electronic device to the portable device; and
   a control circuit, electrically connected between the first data transmission line of the first connector and the power module, the Universal Serial Bus (USB) port of the electronic device supporting a power supply mode and a charging mode, through communication among the control circuit, the power module, and the electronic device, the electronic device being switched to either the power supply mode or the charging mode;
   wherein the power module comprises a first switch member, the first switch is electrically connected between the first power line of the first connector and the second power line of the second connector;
   wherein when the third connector is electrically connected with the AC source, the first switch member is opened so that the first power line and the second power line are not electrically connected;
   when the third connector is not electrically connected with the AC source, the first switch member is closed so that the first power line and the second power line are electrically connected;
   wherein the first switch member comprises a first terminal, a second terminal, and a third terminal, the first terminal being electrically connected with the first power line, the second terminal being electrically connected with the second power line, the third terminal being electrically connected with the third connector;
   wherein when the third connector is electrically connected with the alternating current (AC) source, the first terminal of the first switch member is connected with the third terminal;
   wherein when the third connector is electrically connected with the alternating current (AC) source, the Universal Serial Bus (USB) port of the electronic device is switched to the charging mode;
   when the third connector is not electrically connected with the alternating current (AC) source, the Universal Serial Bus (USB) port of the electronic device is switched to the power supply mode and the first data transmission line and the second data transmission line are electrically connected to each other for the electronic device and the portable device to transmit data to each other.

2. The hub as claimed in claim 1, wherein the first connector is a USB Type-C interface.

3. The hub as claimed in claim 1, wherein the power module comprises:
   an alternating current/direct current (AC/DC) converter, an input end of the alternating current/direct current (AC/DC) converter being electrically connected with the alternating current (AC) source through the third connector, another input end of the alternating current/direct current (AC/DC) converter being electrically connected with the control circuit, the control circuit being able to adjust an output voltage of the alternating current/direct current converter;

a first direct current/direct current (DC/DC) converter, an input end of the first direct current/direct current (DC/DC) converter being electrically connected with the alternating current/direct current (AC/DC) converter, an output end of the first direct current/direct current (DC/DC) converter being electrically connected with the portable device.

4. The hub as claimed in claim 1, further comprising a fourth connector, the fourth connector being electrically connected with another electronic device or a direct current (DC) source which are located in the outside environment, the fourth connector in the hub being electrically connected with the power module, wherein when the fourth connector is electrically connected with the another electronic device, the power module supplies power outputted from the alternating current (AC) source to the another electronic device; when the fourth connector is electrically connected with the direct current (DC) source, the power module supplies power outputted from the direct current (DC) source to the portable device.

5. The hub as claimed in claim 4, wherein the power module comprises:

an alternating current/direct current (AC/DC) converter, an input end of the alternating current/direct current (AC/DC) converter being electrically connected with the alternating current (AC) source through the third connector;

a first direct current/direct current (DC/DC) converter, an input end of the first direct current/direct current (DC/DC) converter being electrically connected with the alternating current/direct current (AC/DC) converter, an output end of the first direct current/direct current (DC/DC) converter being electrically connected with the portable device; and a second direct current/direct current (DC/DC) converter, an input end of the second direct current/direct current (DC/DC) converter being electrically connected with the alternating current/direct current (AC/DC) converter, an output end of the second direct current/direct current (DC/DC) converter being electrically connected with the third terminal of the first switch member;

wherein the control circuit is electrically connected with the first switch member and the second direct current/direct current (DC/DC) converter, the control circuit is able to adjust an output voltage of the second direct current/direct current (DC/DC) converter; when the third connector is electrically connected with the AC source or the fourth connector is electrically connected with the direct current (DC) source, the first terminal of the first switch member is connected with the third terminal; when the third connector is not electrically connected with the alternating current (AC) source and the fourth connector is not electrically connected with the direct current (DC) source, the first terminal of the first switch member is connected with the second terminal.

6. The hub as claimed in claim 4, wherein the power module comprises:

an alternating current/direct current (AC/DC) converter, an input end of the alternating current/direct current (AC/DC) converter being electrically connected with the alternating current (AC) source through the third connector;

a second switch member, electrically connected between the alternating current/direct current (AC/DC) converter and the fourth connector for controlling a connection state of the alternating current/direct current (AC/DC) converter and the fourth connector;

a first direct current/direct current (DC/DC) converter, an input end of the first direct current/direct current (DC/DC) converter being electrically connected with the second switch member, an output end of the first direct current/direct current (DC/DC) converter being electrically connected with the portable device;

the first switch member including a fourth terminal, the fourth terminal being electrically connected with the alternating current/direct current (AC/DC) converter;

a second direct current/direct current (DC/DC) converter, an input end of the second direct current/direct current (DC/DC) converter being electrically connected with the second switch member, an output end of the second direct current/direct current (DC/DC) converter being electrically connected with the third terminal of the first switch member; and a third direct current/direct current (DC/DC) converter, an input end of the third direct current/direct current (DC/DC) converter being electrically connected with the second switch member, an output end of the third direct current/direct current (DC/DC) converter being electrically connected with the fourth terminal of the first switch member;

wherein the control circuit is electrically connected with the first switch member, and the control circuit controls the first terminal of the first switch member to be electrically connected with one of the second terminal, the third terminal, and the fourth terminal;

when the third connector is electrically connected with the alternating current (AC) source, the second switch member is connected;

when the fourth connector is electrically connected with the direct current (DC) source, the second switch member is disconnected;

when the third connector is not electrically connected with the alternating current (AC) source and the fourth connector is not electrically connected with the direct current (DC) source, the first terminal of the first switch member is connected with the second terminal.

7. The hub as claimed in claim 5, further comprising:

an energy storage element;

a charging circuit, an input end of the charging circuit being electrically connected with the alternating current/direct current (AC/DC) converter, an output end of the charging circuit being electrically connected with the energy storage element; and a third switch member, an input end of third switch member being electrically connected with the energy storage element, an output end of third switch member being electrically connected with the second direct current/direct current (DC/DC) converter and the first direct current/direct current (DC/DC) converter;

wherein when the third connector is electrically connected with the alternating current (AC) source or the fourth connector is electrically connected with the direct current (DC) source, the third switch member is disconnected and the charging circuit is to charge the energy storage element; when the third connector is not electrically connected with the alternating current (AC)

source and the fourth connector is not electrically connected with the direct current (DC) source, the third switch member is connected for the energy storage element to be in the power supply mode.

8. The hub as claimed in claim 1, further comprising a fourth connector, the fourth connector being electrically connected with another electronic device or a direct current (DC) source which are located in the outside environment, the fourth connector in the hub being electrically connected with the power module, wherein when the fourth connector is electrically connected with the another electronic device, the power module supplies power outputted from the alternating current (AC) source or the electronic device to the another electronic device; when the fourth connector is electrically connected with the direct current (DC) source, the power module supplies power outputted from the direct current (DC) source to the electronic device or the portable device.

9. The hub as claimed in claim 8, wherein the power module comprises:
an alternating current/direct current (AC/DC) converter, an input end of the alternating current/direct current (AC/DC) converter being electrically connected with the alternating current (AC) source through the third connector,
a first direct current/direct current (DC/DC) converter, an input end of the first direct current/direct current (DC/DC) converter being electrically connected with the alternating current/direct current (AC/DC) converter, an output end of the first direct current/direct current (DC/DC) converter being electrically connected with the portable device; and
wherein when the third connector is electrically connected with the alternating current (AC) source or the fourth connector is electrically with the direct current (DC) source, the first switch member is opened so that the first power line and the second power line are not electrically connected; when the third connector is not electrically connected with the alternating current (AC) source and the fourth connector is not electrically with the direct current (DC) source, the first switch member is closed so that and the first power line and the second power line are electrically connected.

10. The hub as claimed in claim 8, wherein the power module comprises:
an alternating current/direct current (AC/DC) converter, an input end of the alternating current/direct current (AC/DC) converter being electrically connected with the alternating current (AC) source through the third connector,
a first direct current/direct current (DC/DC) converter, an input end of the first direct current/direct current (DC/DC) converter being electrically connected with the alternating current/direct current (AC/DC) converter, an output end of the first direct current/direct current (DC/DC) converter being electrically connected with the portable device; and
a current-sharing circuit, electrically connected between the first power line of the first connector and the second power line of the second connector.

11. The hub as claimed in claim 1, further comprising at least one bridge controller, the bridge controller being electrically connected with the controller, the bridge controller being adapted for transformation of signals in various formats.

12. The hub as claimed in claim 11, further comprising a memory, the bridge controller being connected with the memory.

13. The hub as claimed in claim 12, further comprising an On-The-Go (OTG) controller, the On-The-Go (OTG) controller being electrically connected with the controller, the bridge controller being electrically connected between the On-The-Go (OTG) controller and another memory.

14. The hub as claimed in claim 1, wherein the first connector is a USB interface.

15. The hub as claimed in claim 1, further comprising an energy storage element, the energy storage element being electrically connected with the power module, wherein when the third connector is electrically connected with the alternating current (AC) source, the energy storage element is in the charging mode; when the third connector is not electrically connected with the alternating current (AC) source, the energy storage element is in the power supply mode.

16. The hub as claimed in claim 1, further comprising a controller, the controller electrically connected between the first data transmission line and the second data transmission line.

17. The hub as claimed in claim 16, wherein the controller is adapted to send a signal to the portable device, enabling the portable device to start a quick charge mode.

18. The hub as claimed in claim 1, wherein the power module comprises:
an alternating current/direct current (AC/DC) converter, an input end of the alternating current/direct current (AC/DC) converter being electrically connected with the alternating current (AC) source through the third connector;
a first direct current/direct current (DC/DC) converter, an input end of the first direct current/direct current (DC/DC) converter being electrically connected with the alternating current/direct current (AC/DC) converter, an output end of the first direct current/direct current (DC/DC) converter being electrically connected with the portable device; and
a second direct current/direct current (DC/DC) converter, an input end of the second direct current/direct current (DC/DC) converter being electrically connected with the alternating current/direct current (AC/DC) converter, an output end of the second direct current/direct current (DC/DC) converter being electrically connected with the third terminal of the first switch member;
wherein the control circuit is electrically connected with the first switch member and the second direct current/direct current (DC/DC) converter, the control circuit is able to adjust an output voltage of the second direct current/direct current (DC/DC) converter; when the third connector is electrically connected with the alternating current (AC) source or the fourth connector is electrically connected with a direct current (DC) source, the first terminal of the first switch member is connected with the third terminal; when the third connector is not electrically connected with the alternating current (AC) source and the fourth connector is not electrically connected with the direct current (DC) source, the first terminal of the first switch member is connected with the second terminal.

* * * * *